United States Patent
Lee et al.

(10) Patent No.: US 10,433,126 B2
(45) Date of Patent: Oct. 1, 2019

(54) METHOD AND APPARATUS FOR SUPPORTING PUBLIC TRANSPORTATION BY USING V2X SERVICES IN A WIRELESS ACCESS SYSTEM

(71) Applicant: LG ELECTRONICS INC., Seoul (KR)

(72) Inventors: Ki-Dong Lee, Seoul (KR); Sang Gook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/749,762

(22) PCT Filed: Aug. 3, 2016

(86) PCT No.: PCT/KR2016/008559
§ 371 (c)(1),
(2) Date: Feb. 1, 2018

(87) PCT Pub. No.: WO2017/023112
PCT Pub. Date: Feb. 9, 2017

(65) Prior Publication Data
US 2019/0020986 A1    Jan. 17, 2019

Related U.S. Application Data

(60) Provisional application No. 62/200,636, filed on Aug. 3, 2015.

(51) Int. Cl.
*H04W 4/44* (2018.01)
*H04W 4/029* (2018.01)
(Continued)

(52) U.S. Cl.
CPC ............ *H04W 4/44* (2018.02); *G06Q 10/063* (2013.01); *G06Q 50/30* (2013.01); *G08G 1/202* (2013.01); *H04W 4/029* (2018.02); *H04W 4/046* (2013.01)

(58) Field of Classification Search
CPC ........ H04W 4/44; H04W 4/029; G06Q 50/30; G08G 1/202
See application file for complete search history.

(56) References Cited

U.S. PATENT DOCUMENTS

2013/0290043 A1    10/2013    Hoque et al.
2015/0100189 A1    4/2015    Tellis et al.
2018/0302768 A1*    10/2018    Uchiyama .............. G08G 1/166

FOREIGN PATENT DOCUMENTS

CN    103035122 A    *    4/2013
JP    2002190096        7/2002
JP    2010117965        5/2010

OTHER PUBLICATIONS

Machine translation of CN103035122 (Year: 2013).*
"3GPP TR 22.885 study on LTE support for V2X services," Posted by Yi-Hsueh Tsai, Apr. 8, 2015, retrieved from https://www.slideshare.net/yihsuehtsai/3gpp-tr-22885-study-on-lte-support-for-v2x-services (Year: 2015).*

(Continued)

*Primary Examiner* — David Orange
(74) *Attorney, Agent, or Firm* — Lee, Hong, Degerman, Kang & Waimey

(57) ABSTRACT

The present invention provides methods for supporting a public transportation by using a Vehicle to Everything (V2X) at a Passenger Control Center (PCC) in a wireless access system. One of the methods comprising steps of tracking taxis in a coverage of the PCC in order to support the public transportation; transmitting a first Vehicle to Infrastructure (V2I) or Vehicle to Network (V2N) message (Continued)

triggering a public transportation service to the tracked taxis; receiving a second V2I or V2N message from one or more taxis including location information of each of the taxis; collecting traffic situation information on an area including the PCC; deciding candidate taxis based on the location information and the traffic situation information; and transmitting a third V2I or V2N message indicating pick up passengers at a specific taxi stand to the candidate taxis, wherein each of the taxis is a vehicle user equipment (VUE).

10 Claims, 4 Drawing Sheets

(51) Int. Cl.
*G08G 1/00* (2006.01)
*G06Q 50/30* (2012.01)
*G06Q 10/06* (2012.01)
*H04W 4/04* (2009.01)

(56) References Cited

OTHER PUBLICATIONS

"V2X Use Case: Public Transportation Control System," Chungwoo Hwang, 3GPP TSG-SA WG1 Meeting #71, Aug. 17-21, 2015 (Year: 2015).*
PCT International Application No. PCT/KR2016/008559, Notification of Transmittal of the International Search Report and the Written Opinion of the International Searching Authority, or Declaration dated Nov. 15, 2016, 11 pages.
Kakkasageri, M.S. et al., "Information management in vehicular ad hoc networks: A review", Journal of Network and Computer Applications, Mar. 2014, vol. 39, pp. 334-350, 17 pages.

* cited by examiner (a) Control-Plane Protocol Stack (b) User-Plane Protocol Stack methods and apparatus for supporting public transportation by using V2X services in a wireless access system

METHOD AND APPARATUS FOR SUPPORTING PUBLIC TRANSPORTATION BY USING V2X SERVICES IN A WIRELESS ACCESS SYSTEM

CROSS-REFERENCE TO RELATED APPLICATIONS

This application is the National Stage filing under 35 U.S.C. 371 of International Application No. PCT/KR2016/008559, filed on Aug. 3, 2016, which claims the benefit of U.S. Provisional Application No. 62/200,636, filed on Aug. 3, 2015, the contents of which are all hereby incorporated by reference herein in their entirety.

DESCRIPTION

Technical Field

The present invention relates to a wireless access system, and more particularly, to methods and apparatus for supporting public transportation by using Vehicle to Everything (V2X) services.

Background Art

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY OF THE INVENTION

The object of the present invention is to provide methods for supporting V2X services.

Another object of the present invention is to provide methods for supporting public transportation system.

Still another object of the present invention is to enable V2I and V2P services can substantially improve such situations by making the number of passengers predictable and sufficing public transportation needs in the right time accordingly.

Still another object of the present invention is to provide a vehicle user equipment (VUE) and/or an apparatus for supporting the above-described methods.

Technical problems to be solved by the present invention are not limited to the above-mentioned technical problem, and other technical problems not mentioned above can be clearly understood by one skilled in the art from the following description.

The present invention provides methods and apparatus for supporting public transportation by using Vehicle to Everything (V2X) services.

In one aspect of the present invention, a method for supporting a public transportation by using a Vehicle to Everything (V2X) at a Passenger Control Center (PCC) in a wireless access system, the method comprises steps of tracking taxis in a coverage of the PCC in order to support the public transportation; transmitting a first Vehicle to Infrastructure (V2I) message triggering a public transportation service to the tracked taxis; receiving a second V2I message from one or more taxis including location information of each of the taxis; collecting traffic situation information on an area including the PCC; deciding candidate taxis based on the location information and the traffic situation information; and transmitting a third V2I message indicating pick up passengers at a specific taxi stand to the candidate taxis, wherein each of the taxis is a vehicle user equipment (VUE).

The method further comprising a step of receiving a Vehicle to Pedestrian (V2P) message including preferred information for the public transportation, wherein the candidate taxis are decided based on the preferred information, the location information and the traffic situation information.

In another aspect of the present invention, an apparatus for supporting a public transportation by using a Vehicle to Everything (V2X) in a wireless access system, the apparatus comprises a receiver, a transmitter, and a processor. The processor is configured to: track taxis in a coverage of the apparatus in order to support the public transportation; transmit, by using the transmitter, a first Vehicle to Infrastructure (V2I) message triggering a public transportation service to the tracked taxis; receive, by using the receiver, a second V2I message from one or more taxis including location information of each of the taxis; collect traffic situation information on an area including the apparatus; decide candidate taxis based on the location information and the traffic situation information; and transmit, by using the transmitter, a third V2I message indicating pick up passengers at a specific taxi stand to the candidate taxis, wherein each of the taxis is a vehicle user equipment (VUE).

The processor is further configured to receive, by using the receiver, a Vehicle to Pedestrian (V2P) message including preferred information for the public transportation; and wherein the candidate taxis are decided based on the preferred information, the location information and the traffic situation information.

The V2P message may be received via a specific road side unit (RSU) deployed at the specific taxi stand The preferred information may include a preferred type of a public transportation, a destination with a randomized error range, a preferred type of a service, an anonymized current location of the passengers, and a temporary identification (ID) for the coming taxi driver.

The first V2I message may include taxi stand information indicating a specific taxi stand where passengers are waiting.

The third V2I message may include at least one of taxi stand information or passenger information of the passengers.

The PCC may periodically or event triggered based collect information on a number of passengers on the specific taxi station.

The above embodiments are part of preferred embodiments of the present invention. Obviously, it is to be understood to those having ordinary knowledge in the art that various embodiments having the technical features of the present invention can be implemented on the detailed description of the present invention as set forth herein.

According to exemplary embodiments of the present invention, the following advantages can be obtained.

Firstly, it is possible to provide methods for supporting V2X services.

Secondly, it is possible to provide methods for supporting public transportation system.

Lastly, by using the embodiments, it is possible to provide predictable and sufficing public transportation solutions in the right place and right time.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description served to explain the principle of the invention. In the drawings.

DETAILED DESCRIPTION OF THE INVENTION

Figure 1:
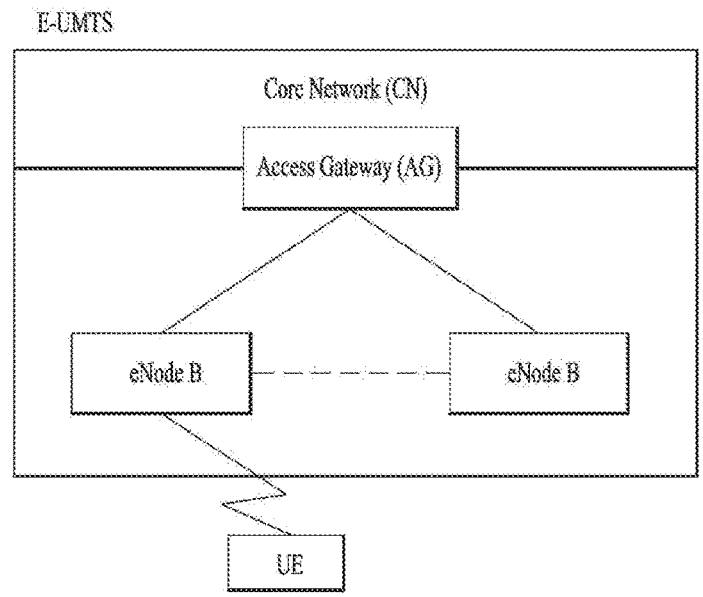
FIG. 1 illustrates a schematic structure a network structure of an evolved universal mobile telecommunication system (E-UMTS)

Exemplary embodiments of the present invention provide a method and apparatus for supporting public transportation by using Vehicle to Everything (V2X) services.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between an enhance Node B (eNB) and a user equipment (UE). The eNB refers to a terminal node of a network, which directly or indirectly communicates with a UE. A specific operation described as being performed by the eNB may be performed by an upper node of the eNB.

Namely, it is apparent that, in a network comprised of a plurality of network nodes including the eNB, various operations performed for communication with a UE may be performed by the eNB, or network nodes other than the eNB. The term 'eNB' may be replaced with a fixed station, an ABS (Advanced Base Station), an MME (Mobility Management Entity), or a RSU (Road Side Unit) etc. Especially, it should be noted that the terms 'eNB' and 'eNode-B' are used interchangeably and the terms 'VUE', 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an UE may serve as a transmitter and an eNB (or NB) may serve as a receiver, on uplink. Likewise, the UE may serve as a receiver and the eNB (or NB) may serve as a transmitter, on downlink.

The embodiments of the present invention are supported by standard documents disclosed for at least one of wireless access systems including a 3GPP system, a 3GPP LTE system, and a 3GPP2 system. In particular, the embodiments of the present invention are supported by 3GPP TS 22.885, 3GPP TS 22.185, 3GPP TS 36.211, 3GPP TS 36.212, 3GPP TS 36.213, 3GPP TS 36.321, and 3GPP TS 36.331 documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs 01-DMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network". In these days, an evolved system of the 3GPP LTE has been appeared and it is referred as 3GPP LTE-A (3GPP LTE advanced) system. Details of the technical specifications of the 3GPP LTE-A system are referred to Releases 9 to 12.

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
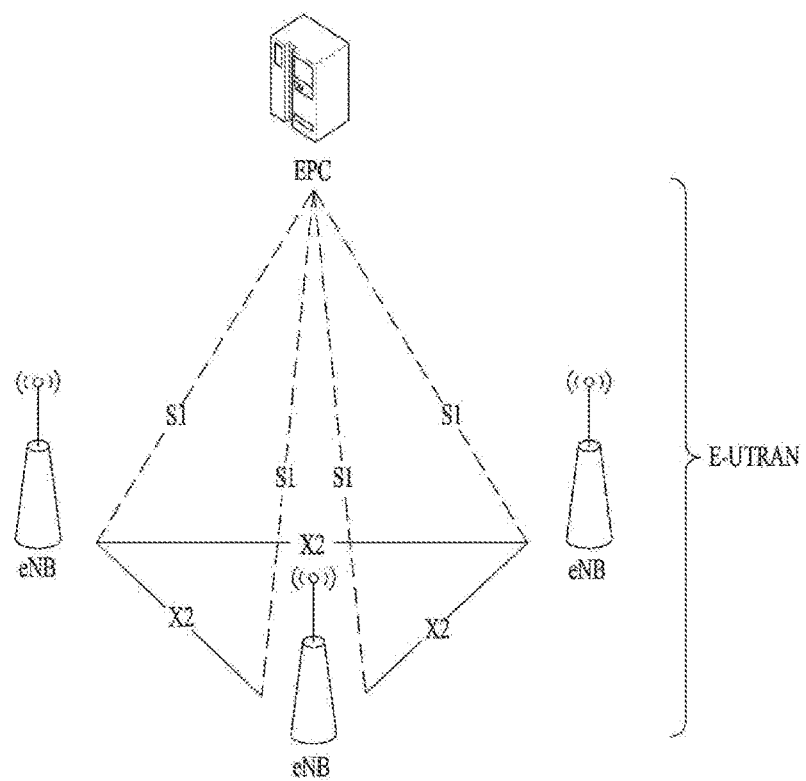
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (e.g., S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

Figure 3:
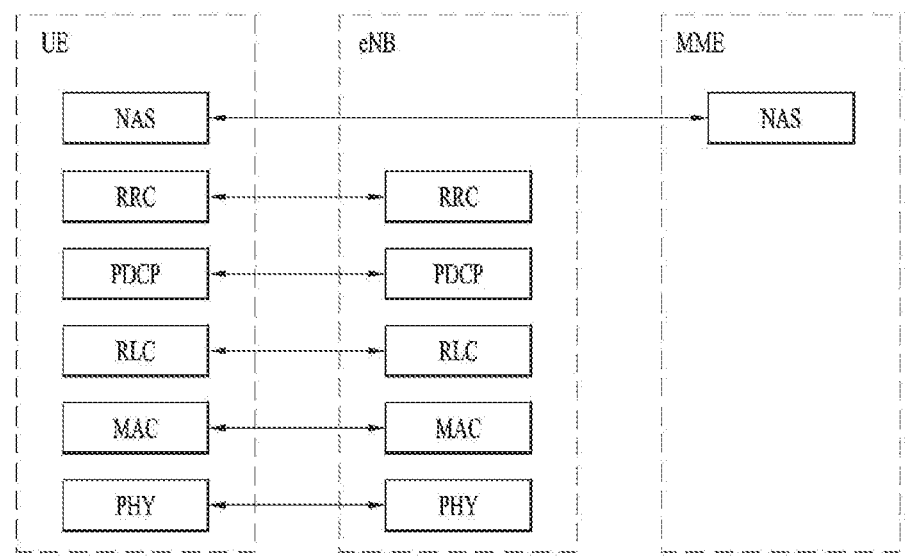
FIG. 3 illustrates the configurations of a radio interface protocol between the E-UTRAN and a UE.
Figure 3:
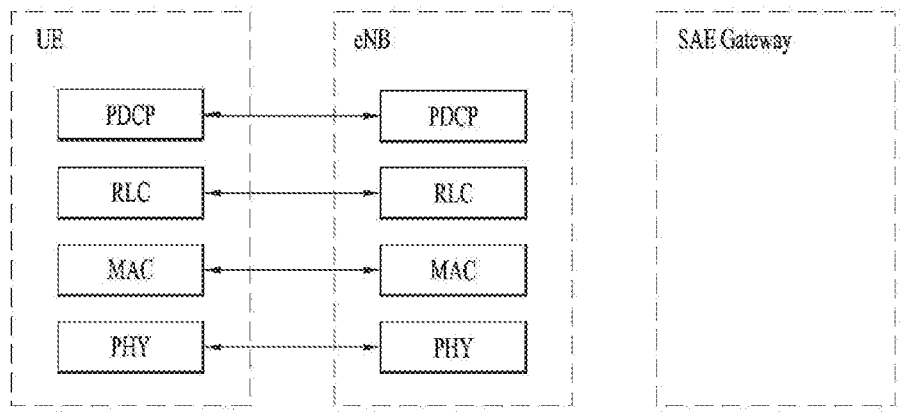

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management. NAS layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED are defined. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-ILDE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

One cell of the eNB is set to use a carrier bandwidth such as 1.25, 2.5, 5, 10 or 20 MHz to provide a downlink transmission or uplink reception service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

2. Vehicle to Everything (V2X) Communication

The V2X communication described in the embodiments of the present application includes four types of V2X applications, such as (i) Vehicle to Vehicle (V2V), (ii) Vehicle to Infrastructure (V2I), (iii) Vehicle to Network (V2N), (iv) Vehicle to Pedestrian (V2P), and (v) Vehicle to Network (V2N).

A V2X Service is a service where the V2X applications can be adopted and is a type of 3GPP communication service that involves a transmission or receiving device on a vehicle. Based on the other party involved in the communication, the V2X services can be divided into V2V Service, V2I Service, V2N service and V2P Service.

Figure 4:
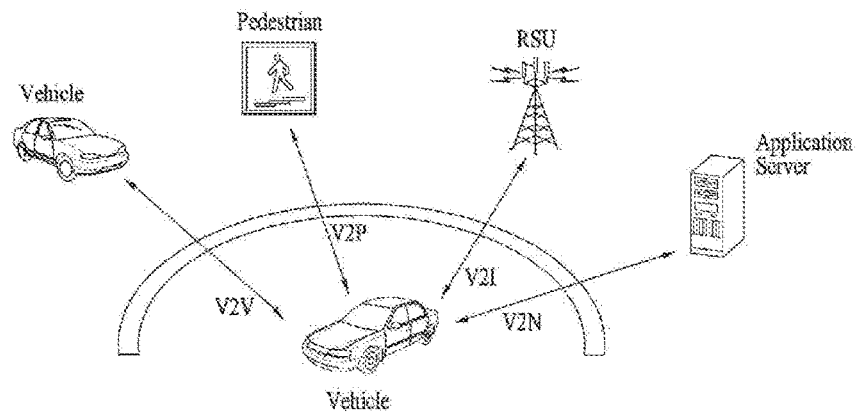
FIG. 4 illustrates types of V2X applications can be applied on embodiments of the present invention.

FIG. 4 illustrates types of V2X applications can be applied on embodiments of the present invention.

Referring to FIG. 4, the V2X communication involves serval entities such as a Road Side Unit (RSU), an Application Server, a vehicle UE (VUE), and a pedestrian UE (PUE). In this case, the RSU is a V2X Service enabled device that can transmit to, and receive from a moving vehicle using V2I Service, and includes UE type RSU, eNB-type RSU. The VUE is a V2X-enabled UE, which supports V2X Service. The VUE can be a UE adopted on the vehicle (e.g., car, motorcycle, bicycle, or train, etc.). The PUE is also a V2X-enabled UE supporting the V2X service but is held by the pedestrian.

The V2I Service is a type of V2X Service, where one party is a vehicle (e.g., VUE) whereas the other party is entity belonging to infrastructure. The V2P Service is a type of V2X Service, where one party is a VUE whereas the other party is a PUE carried by an individual (e.g., handheld terminal carried by a pedestrian, cyclist, driver or passenger). The V2V Service is a type of V2X Service, where both parties of the communication are vehicles. The V2V Communication Range is a direct communication range between two vehicles engaged in V2V Service.

The four types of V2X applications can use "co-operative awareness" to provide more intelligent services for end-users. This means that entities, such as vehicles, roadside infrastructure (e.g., RSU etc.), application server and pedestrians, can collect knowledge of their local environment (e.g., information received from other vehicles or sensor equipment in proximity) to process and share that knowledge in order to provide more intelligent services, such as cooperative collision warning or autonomous driving.

These intelligent transportation services and the associated message sets have been defined in automotive SDOs outside 3GPP. Three basic classes of applications for providing ITS services include road safety, traffic efficiency, and other applications. In this case, 3GPP network system only handles the transport of these messages to support different types of V2X applications.

The V2V applications expect UEs that are in proximity of each other to exchange V2V application information. 3GPP transport of messages containing V2V application information requires the UE to have a valid subscription and authorization from a network operator. Transport for a valid subscriber is provided whether the UE is served or not served by E-UTRAN.

E-UTRAN allows such UEs that are in proximity of each other to exchange V2V-related information using the E-UTRAN when permission, authorization and proximity criteria are fulfilled. The proximity criteria can be configured by the operator.

The UE supporting V2V applications is able to broadcast application layer information (e.g. about its position, dynamics, and attributes as part of the V2V service). The V2V payload may be flexible in order to accommodate different information contents, and the information can be broadcasted periodically according to a configuration provided by the operator. In addition, The UE supporting V2V applications is able to transmit messages containing V2V application information (e.g. location, dynamics, and attributes). The message payloads may be flexible in order to accommodate varying amount of information.

3GPP transport of message containing V2V application information may be predominantly broadcast-based. Such 3GPP transport includes the transport between UEs directly and/or, due to the limited direct communication range, the transport between UEs via infrastructure supporting V2X communication (e.g., RSU, application server, etc.).

The UE supporting V2I applications transmits messages containing V2I application information to an RSU. An RSU transmits messages containing V2I application information to one or more UEs supporting V2I applications.

The UE supporting V2N applications communicates with an application server supporting V2N applications. Both parties communicate with each other via the EPS.

V2P applications expect UEs that are in proximity of each other to exchange V2P application information. 3GPP transport of messages containing V2P application information requires the UE to have a valid subscription and authorization from a network operator. Transport for a valid subscriber is provided whether the UE is served or not served by E-UTRAN.

The UE supporting V2P applications transmits messages containing V2P application information. It is expected that V2P application information can be transmitted either by a UE supporting V2X application in a vehicle (e.g., warning to pedestrian), or by a UE supporting V2X application associated with a vulnerable road user (e.g., warning to vehicle).

3GPP transport of messages containing V2P application information includes the transport between UEs directly and/or, due to the limited direct communication range, the transport between UEs via infrastructure supporting V2X communication, e.g., RSU, application server, etc.

Meanwhile, the main difference between 3GPP transport of messages with V2P and V2V application information is due to the properties of the UE. A UE supporting V2P applications used by pedestrian might, for example, have lower battery capacity, the radio sensitivity might be limited, e.g. due to antenna design, and therefore it may not be able to send messages with the same periodicity as UEs supporting V2V application, and/or receive messages.

In the venue of special event such as ball parks, concert halls, opening ceremony of Olympics, severe congestion due to rapid increase of passengers may occur at the end of the event. This leads to heavy congestion not only on the road, but also at the bus stop or taxi stand where crowded passengers try to get on to the bus or taxi when there is limited supply of public transportation available. Enabling V2I and V2P services can substantially improve such situations by making the number of passengers predictable and sufficing public transportation needs in the right time accordingly.

3. Methods for Improving Inequality Between Public Transportation Supply and Demand for Waiting Passengers Embodiments will be described hereinafter may be performed based on the technical characteristics described above sections 1 and 2.

A Passenger Control Center (PCC) may be deployed with V2I, V2N and/or V2P enabled RSU which collects information on the number of people waiting on a taxi stand. The PCC also tracks how many taxis are available within RSU's coverage and calculates how many taxis are needed to board awaiting passengers.

A passenger (i.e., a user equipment (UE)) awaiting public transportation may send its preferred information to the PCC via V2P interface. The preferred information includes a preferred type of a public transportation (e.g., taxi, bus or trains . . . etc.), a destination with a randomized error range (to protect its privacy if needed as in mock location), a preferred type of service (e.g., individual riding or shared riding), an anonymized current location of the passenger (to protect the location information of the passenger), and a temporary identification (ID) for the coming taxi driver (or the service provider) to identify this passenger at arrival. The preferred information can be sent through V2P request message. The PCC may check the passenger is just a pedestrian or a passenger wishing to take the public transportation. For checking the passenger, the PCC is able to measure a time during the passenger staying around the specific spots (e.g., the bus station, the taxi stand) and/or a distance of the passenger from the specific spots by using common schemes. Alternatively, the PCC is able to know the pedestrian is the passenger by receiving the V2P request message.

As another aspect of the embodiments, a specific RSU can be deployed at the specific sport in order to collect passenger information. The specific RSU is able to receive and transfer the preferred information which has been set by the UE to the PCC. Or the specific RSU is able to estimate the number of the passengers via the V2P interface. In this case, the specific RSU transmits information indicating the number of passengers which need the public transportation.

Hereinafter, the embodiments of the present invention for supporting public transportation systems are specifically described.

Figure 5:
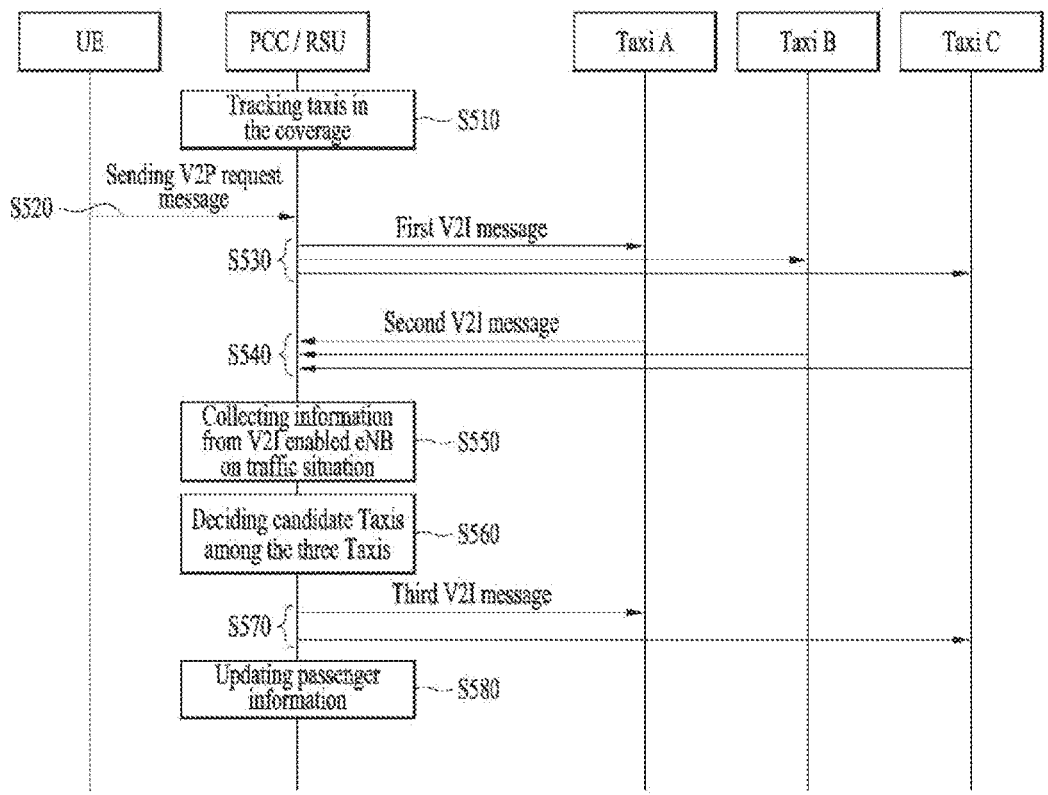
FIG. 5 illustrates one of embodiments for supporting public transportation system.

FIG. 5 illustrates one of embodiments for supporting public transportation system.

Referring to FIG. 5, the PCC is deployed with V2I and V2P enabled RSU which periodically or event triggered based (e.g., at the end of special events) collects information on the number of people (i.e., the passengers) waiting on the taxi stand. The PCC also tracks how many public transportations (e.g., taxis) are available within RSU's coverage. The PCC calculates how many taxis are needed to board awaiting passengers based on the collected information of the passengers (S510).

The Passengers (i.e., the UE) awaiting public transportation send a V2P request message including preferred information. The preferred information includes a preferred type of transportations (e.g., taxi, bus or trains . . . etc.), a destination with a randomized error range (to protect its privacy if needed as in mock location), a preferred type of service (e.g., individual riding or shared riding), an anonymized current location of the passenger (to protect the location information of the passenger), and a temporary identification (ID) for the coming taxi driver (or the service provider) to identify this passenger at arrival (S520).

The public transportation recited in the embodiments of the present application includes various types of vehicles such as a taxi, a bus, a subway, and a train etc. However, for convenience of the explanation of the embodiments, the taxi is representatively used for the vehicles but the concepts of embodiments can be also applied to the other type vehicles. In addition, the taxis at the FIG. 5 are the V2I and the V2P enabled VUEs.

Referring back to FIG. 5, at the step S520, the V2P request message is directly transmitted from the UEs or transmitted via the specific RSU deployed at a specific taxi stand (i.e., a taxi stand 1). The specific RSU that is a V2I enabled RSU manages the taxi stand 1 and collects the V2P request messages in its coverage.

If the PCC receives the V2P request message from the UEs (i.e., the passengers) or the specific RSU at the taxi stand 1, the PCC is able to processing how to match the UEs with the prefer VUEs (i.e., vehicles for the public transportations) base on the preferred information. For example, the PCC may classify the passengers with the preferred type of transportations the destination, and/or the preferred type of services and then match the classified UEs to the preferred public transportations.

When the PCC with the RSU receives the V2P request messages from the UEs, the PCC broadcasts or transmits a first V2I message triggering the public transportation service to the taxis in the PCC coverage. The first V2I message may include taxi stand information indicating the taxi stand 1 and/or estimated information for the number of passengers nearby the taxi stand 1 (S530).

If the taxis A, B, and C receive the first V2I message indicating that there are large number of people waiting from the taxi Stand 1, the taxis A, B, and C send second V2I messages to PCC informing their locations. That is, each of the second V2I messages includes location information of each of the taxis (S540).

The PCC may periodically or event triggered based collect traffic situation information on an area including the PCC from one or more V2I enabled eNBs. The one or more V2I enabled eNBs are deployed in the coverage of the PCC and/or nearby the PCC (S550).

The PCC may decide candidate taxis that can reach the taxi stand 1 within a specific time (i.e., 5 minutes) based on the collected traffic situation information, the location information, and the collected traffic situation information. For example, the PCC is able to decide that the taxi A and C are the candidate taxis (S560).

In this case, the PCC ignores broadcast V2I message from Taxi B as it cannot reach to the taxi stand 1 within the specific time or a threshold time (e.g., 30 minutes) based on its decision/calculation under the given traffic situation.

The PCC broadcasts or transmits the third V2I message to the taxi A and the taxi C to pick up the passengers waiting from the taxi stand 1 (S570).

The third V2I message includes the identifier of the taxi stand 1 (or taxi stand information) and/or passenger information of the passengers.

The taxi A and taxi C receiving the third V2I message from the PCC, individually move to the taxi stand 1 and pick up the passengers from the taxi stand 1.

In addition, the PCC is able to gather and update passenger information (e.g., number of people remaining) at the taxi stand 1 from a RSU managing the taxi stand 1 (i.e., an V2I enabled taxi stand 1's RSU) and/or directly from V2P service enabled passengers waiting at the taxi stand 1 (S580).

As another aspect of the embodiment described on FIG. 5, V2N messages can be used instead of the V2I messages. In this case, the PCC can be one of application servers or can be deployed with V2N enabled RSU. Accordingly, the first, the second and the third V2I messages are replaced with a first, a second and a third V2N messages using a V2N interface.

At the embodiments of the present application, an RSU is able to transmit/receive a periodic broadcast message to a UE using V2I and V2P applications with minimum frequency of message per second. In addition, an RSU is able to transmit/receive a periodic broadcast message size of [50-300] bytes. In addition, a UE is able to transmit/receive a periodic broadcast message of [50-300] bytes in size and the LTE system is able to support maximum latency of [50] ms for V2X service. In addition, an RSU is able to support a communication range up to [400] m and an RSU is able to share anonymized location information of V2I enabled UEs covered within their coverage.

4. Apparatuses for Implementing the Aforementioned Methods

Figure 6:
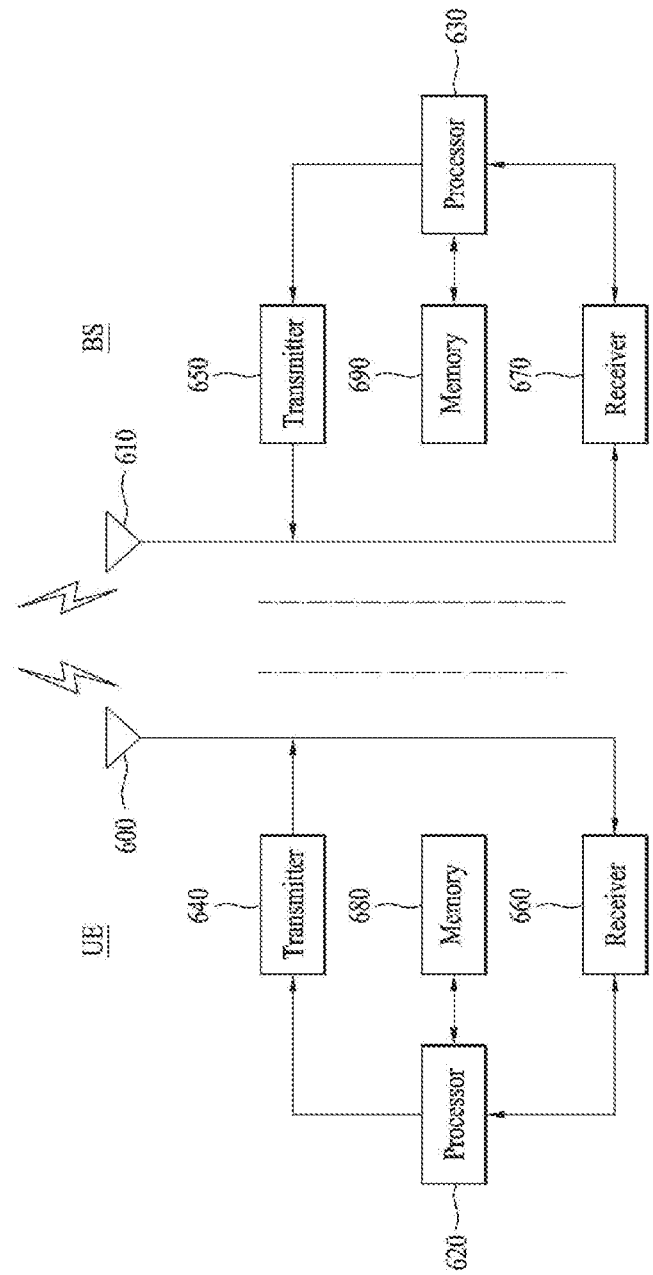
FIG. 6 shows apparatuses for implementing the above-mentioned methods described with reference to FIGS. 1 through 5.

FIG. 6 shows apparatuses for implementing the above-mentioned methods described with reference to FIGS. 1 to 5.

A UE can serve as a transmitting end on uplink and as a receiving end on downlink. An eNB can serve as a receiving end on uplink and as a transmitting end on downlink.

The UE and the eNB may include a transmitter 640 and 650 and receiver 660 and 670 for controlling transmission and reception of signal, data and/or messages and antennas 600 and 610 for transmitting and receiving signal, data and/or messages, respectively.

In addition, the UE and the eNB may respectively include processors 620 and 630 for performing the above-described embodiments of the present invention and memories 670 and 690 for storing processing procedures of the processors temporarily or continuously.

The embodiments of the present invention can be performed using the aforementioned components and functions of the UE and the eNB. The apparatuses shown in FIG. 6 may be one of members illustrated in FIGS. 1, 2 and 4. For example, the eNB in FIG. 6 can be referred to the PCC with the RSU and the UE in FIG. 6 can be referred to one of the VUEs which is the taxi.

The processor of the PCC is configured to: track taxis in a coverage of the apparatus in order to support the public transportation; transmit, by using the transmitter, a first Vehicle to Infrastructure (V2I) message triggering a public transportation service to the tracked taxis; receive, by using the receiver, a second V2I message from one or more taxis including location information of each of the taxis; collect traffic situation information on an area including the apparatus; decide candidate taxis based on the location information and the traffic situation information; and transmit, by using the transmitter, a third V2I message indicating pick up passengers at a specific taxi stand to the candidate taxis, wherein each of the taxis is a vehicle user equipment (VUE). The specific embodiments by performing the VUEs and the eNB can be referred to the embodiments explained above.

The transmitter 640 and 650 and the receiver 660 and 670 included in the UE and the eNB can have packet modulation and demodulation functions, a fast packet channel coding function, an OFDMA packet scheduling function, a TDD packet scheduling function and/or a channel multiplexing function. In addition, the UE and the eNB may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the UE.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP and/or 3GPP2 system, etc. The embodiments of the present invention may be applied to technical fields using the various wireless access systems in addition to the wireless access systems.

What is claimed is:

1. A method of transceiving messages for public transportation by a Passenger Control Center (PCC) in a wireless access system, the method comprising:
    tracking vehicles in a coverage of the PCC;
    transmitting a first message triggering a public transportation service to the tracked vehicles;
    receiving a second message from one or more vehicles among the tracked vehicles including location information on each of the one or more vehicles;
    receiving traffic situation information on the coverage of the PCC from a base station;
    determining a candidate vehicle based on the location information and the traffic situation information; and
    transmitting a third message to the candidate vehicle to pick up passengers at a specific location,
    wherein the PCC is further configured to receive a fourth message including priority information for the public transportation, and determine the candidate vehicle based on the priority information, the location information and the traffic situation information, and
    wherein the priority information includes a type of public transportation, a destination with a randomized error, a type of service, an anonymized current location of the passengers, and a temporary identification (ID) for a coming vehicle driver.

2. The method according to claim 1, wherein the fourth message is received via a road side unit (RSU) deployed at the specific location.

3. The method according to claim 1, wherein the first message includes information on the specific location where passengers are waiting.

4. The method according to claim 1, wherein the third message includes passenger information of the passengers.

5. The method according to claim 1, wherein the PCC periodically collects information on a number of passengers on the specific location.

6. A Passenger Control Center (PCC) for transceiving messages for public transportation in a wireless access system, the PCC comprising:
    a receiver;
    a transmitter; and
    a processor configured to:
    track vehicles in a coverage of the PCC;
    transmit, via the transmitter, a first message triggering a public transportation service to the tracked vehicles;
    receive, via the receiver, a second message from one or more vehicles among the tracked vehicles including location information on each of the one or more vehicles;
    receive traffic situation information on the coverage of the PCC from a base station;
    determine a candidate vehicle based on the location information and the traffic situation information; and
    transmit, via the transmitter, a third message to the candidate vehicle to pick up passengers at a specific location,
    wherein the processor is further configured to control the receiver to receive a fourth message including priority information for the public transportation, and determine the candidate vehicle based on the priority information, the location information and the traffic situation information, and
    wherein the priority information includes a type of public transportation, a destination with a randomized error, a type of service, an anonymized current location of the passengers, and a temporary identification (ID) for a coming vehicle driver.

7. The PCC according to claim 6, wherein the fourth message is received via a road side unit (RSU) deployed at the specific location.

8. The PCC according to claim 6, wherein the first message includes information on the specific location where passengers are waiting.

9. The PCC according to claim 6, wherein the third message includes passenger information of the passengers.

10. The PCC according to claim 6, wherein the PCC periodically collects information on a number of passengers on the specific location.

* * * * *